US010633781B2

(12) United States Patent
Lv et al.

(10) Patent No.: US 10,633,781 B2
(45) Date of Patent: Apr. 28, 2020

(54) VIBRATION DETECTION DEVICE OF WASHING MACHINE

(71) Applicant: QINGDAO HAIER WASHING MACHINE CO., LTD., Shandong (CN)

(72) Inventors: Peishi Lv, Shandong (CN); Lin Yang, Shandong (CN); Yun Tian, Shandong (CN); Gangjin Zhang, Shandong (CN); Mingyan Shao, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 187 days.

(21) Appl. No.: 15/748,945

(22) PCT Filed: Jul. 26, 2016

(86) PCT No.: PCT/CN2016/091745
§ 371 (c)(1),
(2) Date: Jan. 30, 2018

(87) PCT Pub. No.: WO2017/020755
PCT Pub. Date: Feb. 9, 2017

(65) Prior Publication Data

US 2019/0003101 A1 Jan. 3, 2019

(30) Foreign Application Priority Data

Jul. 31, 2015 (CN) .......................... 2015 1 0468408

(51) Int. Cl.
*G01H 11/02* (2006.01)
*D06F 37/24* (2006.01)
(Continued)

(52) U.S. Cl.
CPC ............ *D06F 39/003* (2013.01); *D06F 37/20* (2013.01); *D06F 37/24* (2013.01); *G01H 11/02* (2013.01); *D06F 2204/08* (2013.01)

(58) Field of Classification Search
CPC .......... D06F 37/24; D06F 33/02; D06F 17/06; D06F 37/20; F16F 15/03; F16F 15/04
See application file for complete search history.

(56) References Cited

U.S. PATENT DOCUMENTS 5,657,649 A 8/1997 Lim
7,445,094 B1 * 11/2008 Henderson ............. F16F 9/535 188/267

(Continued)

FOREIGN PATENT DOCUMENTS

CN 2680704 Y 2/2005
CN 1755008 A 4/2006

(Continued)

OTHER PUBLICATIONS

International Search Report (PCT/ISA/210) dated Sep. 27, 2016, by the Chinese Patent Office as the International Searching Authority for International Application No. PCT/CN2016/091745.

(Continued)

*Primary Examiner* — Brandi N Hopkins
(74) *Attorney, Agent, or Firm* — Buchanan Ingersoll & Rooney PC

(57) ABSTRACT

A vibration detection device of washing machine comprises a suspender, a damping spring, a sleeve, a bottom cover and an electromagnetic sensing device. The electromagnetic sensing device comprises an electromagnetic coil and a magnet. The upper end of the suspender is connected with a casing of the washing machine, and the sleeve sleeves the lower part of the suspender in a slidable manner. The damping spring is arranged in the sleeve and at least have two damping springs, and the damping springs have differ- (Continued)

ent elastic coefficients and are connected in series. The magnet is connected with the suspender, and the bottom cover is fixedly arranged at the bottom of the sleeve. The electromagnetic coil and the bottom cover are relatively fixed.

9 Claims, 3 Drawing Sheets

(51) Int. Cl.
*D06F 37/20* (2006.01)
*D06F 39/00* (2020.01)

(56) References Cited

U.S. PATENT DOCUMENTS

| | | | | |
|---|---|---|---|---|
| 9,388,522 | B2 * | 7/2016 | Yoon | D06F 37/24 |
| 2004/0231373 | A1 * | 11/2004 | Kim | D06F 37/20<br>68/23.1 |
| 2012/0144873 | A1 | 6/2012 | Back et al. | |
| 2013/0042492 | A1 * | 2/2013 | Nishimura | D06F 33/02<br>34/108 |

FOREIGN PATENT DOCUMENTS

| | | | |
|---|---|---|---|
| CN | 2881209 | Y | 3/2007 |
| CN | 102560976 | A | 7/2012 |
| CN | 103088599 | A | 5/2013 |
| CN | 204401312 | U | 6/2015 |
| JP | H05-84382 | A | 4/1993 |
| JP | H06-277389 | A | 10/1994 |
| JP | 2001-120885 | A | 5/2001 |
| JP | 2002-143594 | A | 5/2002 |
| KR | 20150075977 | A | 7/2015 |

OTHER PUBLICATIONS

Written Opinion (PCT/ISA/237) dated Sep. 27, 2016, by the Chinese Patent Office as the International Searching Authority for International Application No. PCT/CN2016/091745.

Office Action dated Apr. 28, 2019 in corresponding Korean Patent Application No. 2019-012477344, 5 pages.

Chinese Retrieval dated Oct. 16, 2018 in corresponding Chinese Patent Application No. 2015104684086, 2 pages.

Extended European Search Report dated Jun. 28, 2018 in corresponding European Patent Application No. 16832243.6-1018, 8 pages.

Office Action mailed Nov. 5, 2019 in corresponding Japanese Patent Application No. 2018-524521, 5 pages.

* cited by examiner

VIBRATION DETECTION DEVICE OF WASHING MACHINE

TECHNICAL FIELD

The present disclosure relates to a vibration detection device, particularly relates to a vibration detection device of washing machine and belongs to the field of washing machines.

BACKGROUND

Vibration-damping components of a traditional washing machine only play a role in damping vibration of the washing machine during the dewatering process and have no other functions. During the use of the washing machine, water inflow needs to be determined according to the weight of clothing, and meanwhile, the vibratory magnitude of an outer tub is required to be detected and controlled as the vibration of the outer tub is relatively great when the washing machine begins to perform dewatering.

In view of this, the present disclosure is provided.

SUMMARY

A technical problem to be solved by the present disclosure is to overcome the defects in the prior art and provide a vibration detection device of a washing machine. The weighing detection of the washing machine and the vibration detection of the outer tub of the washing machine can be achieved.

In order to solve the technical problem described above, a basic concept of a technical solution of the present disclosure is as follows:

a vibration detection device of a washing machine comprises a suspender, a damping spring, a sleeve, a bottom cover and an electromagnetic sensing device, wherein the electromagnetic sensing device comprises an electromagnetic coil and a magnet, an upper end of the suspender is connected with a casing of the washing machine, the magnet is connected with the suspender;

the bottom cover is fixedly arranged at a bottom of the sleeve;

the electromagnetic coil is arranged at the lower part of the suspender, at least two damping springs are arranged in the sleeve, the damping springs have different elastic coefficients and are connected in series, and the electromagnetic coil and the bottom cover are relatively fixedly, when the sleeve slides on the suspender, a change of a force exerted to the sleeve by an outer tub of the washing machine and the vibratory magnitude of the outer tub of the washing machine are reflected depending on a change of a magnetic flux of the electromagnetic coil.

Further, the damping springs comprise a first damping spring and a second damping spring, a lower end of the second damping spring is in contact with a lower end of the suspender, and an upper end of the first damping spring is in contact with a top of an inner side of the sleeve.

Further, the vibration detection device of the washing machine further comprises a connecting member, wherein the first damping spring and the second damping spring are connected through the connecting member, the connecting member is in a shape of a cylinder with an outer diameter matched with an inner diameter of the sleeve, and the connecting member sleeves the suspender in a slidable manner.

Further, the magnet is arranged at the bottom end of the suspender and is connected with the suspender, and the electromagnetic coil sleeves on the magnet and is connected with the bottom cover.

Further, the bottom cover is arranged at the lower end of the sleeve and is fixedly connected with the sleeve, the magnet and the electromagnetic coil are enclosed inside the sleeve by the bottom cover, and the electromagnetic coil is fixed on the bottom cover;

A first compression spring arranged between the bottom cover and the magnet is respectively connected with the bottom cover and the magnet, and a second compression spring arranged between a bottom end of the suspender and the magnet is connected with the bottom end of the suspender and the magnet.

Further, a spring seat and a fixing base are further arranged at the lower end of the suspender, the spring seat and the fixing base are a shape of convex platform with a center through hole, the fixing base sleeves on the suspender and is supported by the lower end of the suspender, and the spring seat sleeves the fixing base and is in contact with the lower end of the second damping spring to support the second damping spring.

Further, the vibration detection device of the washing machine further comprises a sliding cup, wherein the sliding cup is ring-shaped, the sliding cup sleeves on the fixing base and is clamped by a big-diameter section of the fixing base and a big-diameter section of the spring seat, and an outside diameter of the sliding cup is matched with the inside diameter of the sleeve.

Further, an axial guiding groove is formed in a center of the bottom cover, the electromagnetic coil is fixed on an inner wall of the guiding groove. The magnet is located inside the guiding groove, and an outer circumference of the magnet is matched with an circumference of the electromagnetic coil.

Further, the first damping spring is shorter than the second damping spring.

After adopting the above-mentioned technical scheme, as compared with the prior art, the present disclosure has the following beneficial effects.

According to the vibration detection device of the washing machine provided by the present disclosure, the top of the suspender is connected with the casing of the washing machine, and the top of the sleeve is connected with the outer tub of the washing machine, so that the outer tub of the washing machine is suspended in the casing. Before the washing machine begins to work, pre-weighing is carried out firstly by the vibration detection device of the washing machine, and then weighing is carried out after clothing is put into the washing machine by users. Because the inner tub of the washing machine and the outer tub of the washing machine are connected together, the outer tub exerts a force on the sleeve, and the sleeve slides relative to the suspender, then, the electromagnetic coil and the magnet perform relative motions, thus, the magnetic flux in the electromagnetic coil changes, the inductance in the electromagnetic coil changes. A computer program controller is used for determining the weight of the clothing through detecting the inductance change in the electromagnetic coil and determining the weight of the clothing and the water inflow through twice weighing. When water enters into the inner tub of the washing machine, as the inner tub and the outer tub are connected together, the pressure on the sleeve exerted by the outer tub increases and then the damping springs are compressed, the sleeve slides along the suspender, then, the magnet and the electromagnetic coil make relative displacement, the magnetic flux of the electromagnetic coil changes, and the inductance in the electromagnetic coil changes. The inductance in the electromagnetic coil is detected through a corresponding device, thus, the weight of water inflow of the washing machine can be detected, and thus, the water inflow is controlled. When dewatering of the washing machine beings, the outer tub will generate vibration, energy of vibration is absorbed through the deformation of the damping springs to achieve vibration damping. The vibratory magnitude of the outer tub is achieved through detecting the inductance change of the electromagnetic coil. The control program of the computer program controller of the washing machine is used for carrying out load error correcting, and thus, the stability of dewatering operation of the washing machine is improved.

The specific embodiments of the present disclosure are further described in detail below with reference to the drawings.

Reference Signs: 1—suspender seat, 2—suspender, 3—sleeve, 41—first damping spring, 42—second damping spring, 5—magnet, 6—electromagnetic coil, 7—conductor, 8—sliding cup, 9—base, 10—connecting member, 11—spring seat, 12—fixing base, 13—gasket, 14—bottom cover, 15—first compression spring, and 16—second compression spring.

DETAILED DESCRIPTION

Embodiment I

Figure 1:
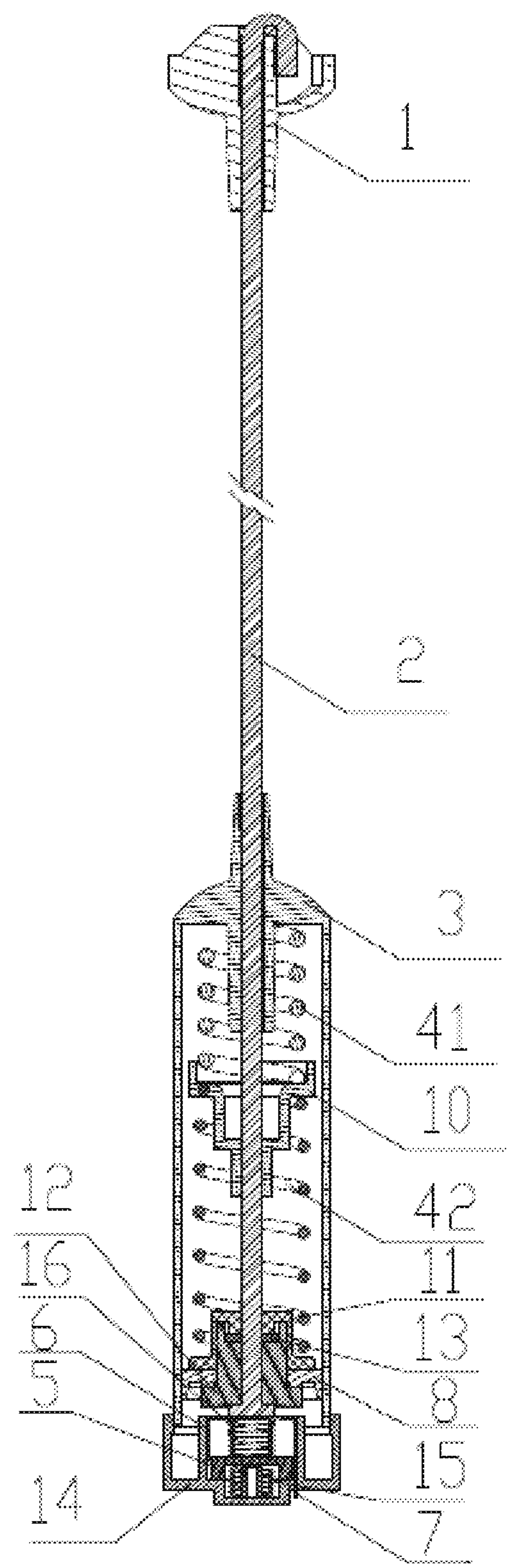
FIG. 1 is a structural schematic diagram of a vibration detection device of a washing machine in Embodiment I of the present disclosure.
Figure 2:
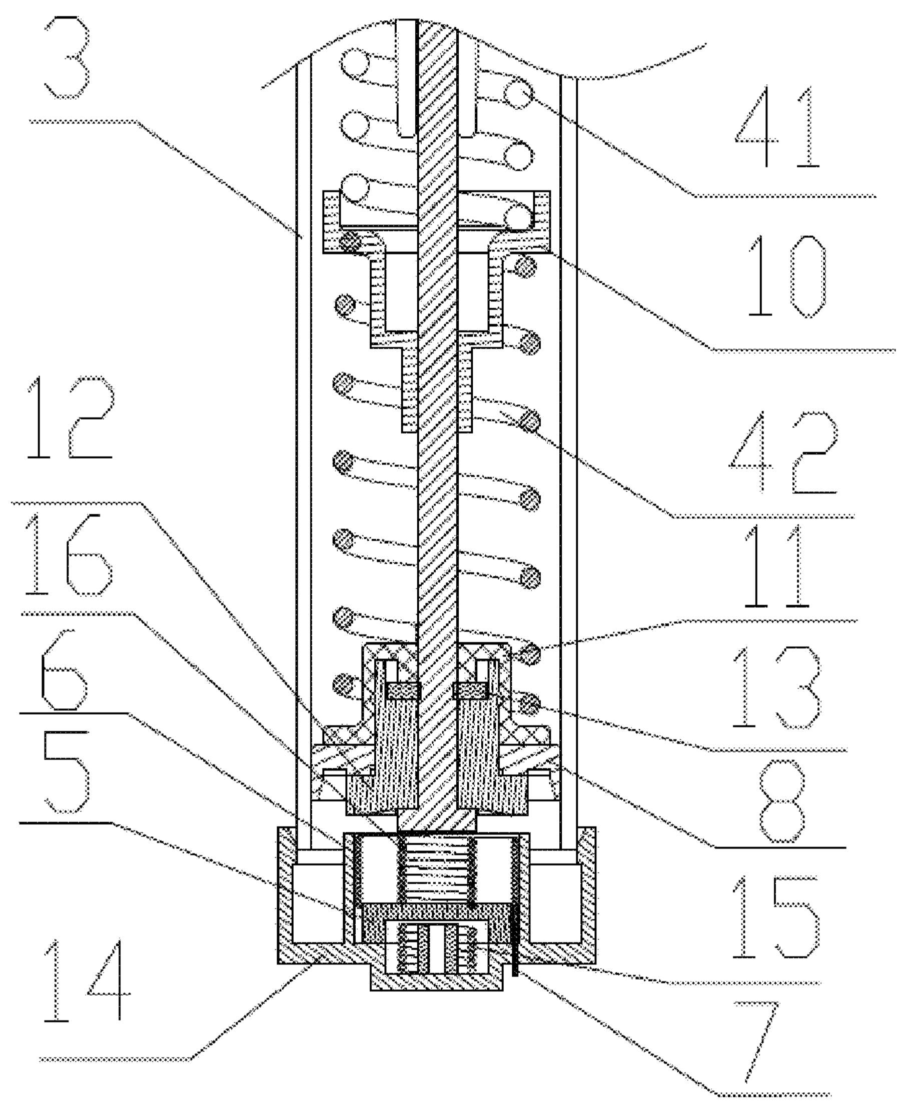
FIG. 2 is a local enlarged schematic diagram of the FIG. 1.
Figure 3:
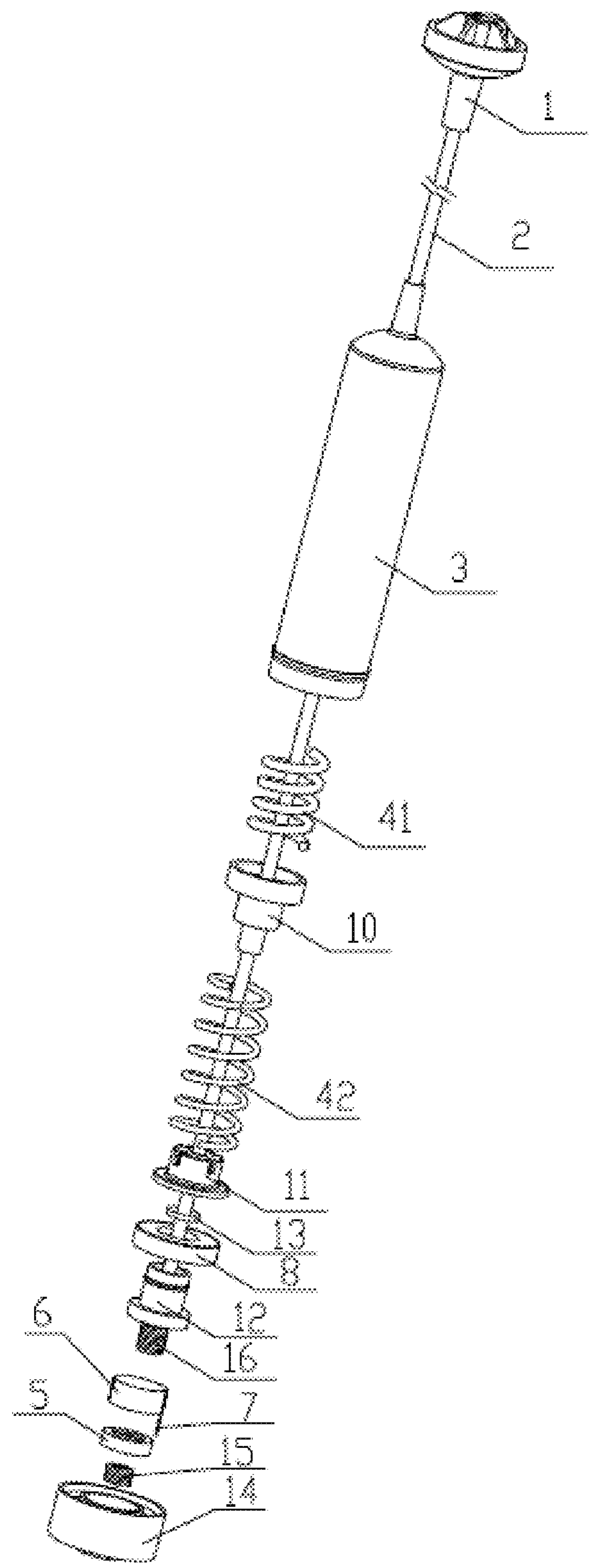
FIG. 3 is a disassembled schematic diagram of a vibration detection device of a washing machine in Embodiment I of the present disclosure.

As shown in FIG. 1, FIG. 2 and FIG. 3, a vibration detection device of a washing machine, provided by the present disclosure, comprises a suspender 2, damping springs, an electromagnetic coil 6, a magnet 5 and a sleeve 3, an upper end of the suspender 2 is connected with a casing of the washing machine. In this embodiment, in order to better connect the suspender 2 and the casing of the washing machine, a suspender seat 1 is arranged at the upper end of the suspender 2 and the suspender seat 1 is connected with a snap ring on the inner wall of the casing of the washing machine. The snap ring supports the suspender seat 1, and thus, the suspender 2 is connected with the casing of the washing machine. A top of the sleeve 3 is connected with a hanging seat on an outer tub, the sleeve 3 is located below the hanging seat and supports the hanging seat. The outer tub of the washing machine is suspended in the casing by four vibration detection devices of the washing machine provided by the present disclosure.

The sleeve 3 can slide along the suspender 2 axially. A bottom cover 14 is fixedly arranged at the lower end of the sleeve 3 and is fixedly connected with the sleeve 3. The magnet 5, a first compression spring 15 and a second compression spring 16 are arranged below the suspender 2. The magnet 5, the electromagnetic coil 6, the first compression spring 15 and the second compression spring 16 are enclosed inside the sleeve 3 by the bottom cover 14. The electromagnetic coil 6 is fixed in the bottom cover 14. The first compression spring 15 arranged between the bottom cover 14 and the magnet 5 is respectively connected with the bottom cover 14 and the magnet 5, and the second compression spring 16 arranged between a bottom end of the suspender 2 and the magnet 5 is respectively connected with the bottom end of the suspender 2 and the magnet 5.

The magnet 5, the first compression spring 15 and the second compression spring 16 are all of structures capable of freely rotating, or, one or two of the three mentioned above can be rotated freely along a central axis of the sleeve 3, so that the damage to the magnet 5, the first compression spring 15 and the second compression spring 16 caused by torsion during movement is prevented. The elastic coefficients of the first compression spring 15 and second compression spring 16 are designed according to displacement change of the magnet 5 and cannot be smaller than a test range of water inflow, and the magnet 5 always has a change in displacement during water intake of the washing machine.

The first compression spring 15 and the second compression spring 16 are used for making the amplitude of relative movement between the magnet 5 and the electromagnetic coil 6 to be smaller when the sleeve 3 slides on the suspender 2 under stress. The first compression spring 15 and the second compression spring 16 are gradually released when the sleeve 3 upwards moves relative to the suspender 2, and the amplitude of upward movement of the electromagnetic coil 6 relative to the magnet 5 is lower due to the stretching amplitudes of the first compression spring 15 and the second compression spring 16. In a similar way, the first compression spring 15 and the second compression spring 16 are compressed when the sleeve 3 downwards moves relative to the suspender 2, and the amplitude of downward movement of the electromagnetic coil 6 relative to the magnet 5 is lower due to the compressed amplitudes of the first compression spring 15 and the second compression spring 16. The elastic coefficient of the first compression spring 15 is smaller than that of the second compression spring 16.

An axial guiding groove is formed in the center of the bottom cover 14, the electromagnetic coil 6 is fixed on an inner wall of the guiding groove, the magnet 5 is located inside the guiding groove, and an outer circumference of the magnet 5 is matched with an inner circumference of the electromagnetic coil 6. Thus, the magnet 5 can only move along the guiding groove without radial sloshing. Thus, the interference of magnetic flux variation caused by the radial sloshing of the magnet 5 is avoided, which makes the detection more accurate.

The number of the damping springs at least is two, and the damping springs have different elastic coefficients and are connected in series.

As shown in FIG. 1, FIG. 2 and FIG. 3, in this embodiment, the damping spring has two, i.e., the first damping spring 41 and the second damping spring 42. The vibration detection device of the washing machine further comprises a connecting member 10, the first damping spring 41 and the second damping spring 42 are connected through the connecting member 10. The connecting member 10 is in the shape of a cylinder with an outer diameter matched with the inner diameter of the sleeve 3, and the connecting member 10 sleeves on the suspender 2 in a slidable manner.

A spring seat 11 and a fixing base 12 are further arranged at the lower end of the suspender 2, the spring seat 11 and the fixing base 12 are a shape of convex platform with a center through hole, the fixing base 12 sleeves on the suspender 2 and is supported by the lower end of the suspender 2. The spring seat 11 sleeves on the fixing base 12 and is in contact with the bottom end of the corresponding damping spring to support the corresponding damping spring.

The vibration detection device of the washing machine further comprises a sliding cup 8, the sliding cup 8 is ring-shaped, and sleeves on the fixing base 12 and is clamped by a lower end face of a big-diameter section of the fixing base 12 and an upper end face of a big-diameter section of the spring seat 11. And the outside diameter of the sliding cup 8 is matched with the inside diameter of the sleeve 3 in a sliding contact manner.

In this embodiment, for the two damping springs, the elastic coefficient of the first damping spring 41 is greater than that of the second damping spring 42. The length of the first damping spring 41 is smaller than that of the second damping spring 42, and the second damping spring 42 is located between the connecting member 10 and the spring seat 11.

When the washing machine is empty load, the second damping spring 42 plays a leading role. With the increase of water intake, the effect of the second damping spring 42 is gradually weakened until the second damping spring 42 is compressed and loses elastic displacement. The effect of the first damping spring 41 is gradually strengthened. The first damping spring 41 is close to a compressed state when the washing machine is filled with water.

The elastic coefficients of the damping springs are designed based on calculation, tests and verification under a variety of conditions such as such as empty load, different load and full load of the washing machine.

When water enters an inner tub of the washing machine and then the weight of the inner tub increases, compressive deformation of the second damping spring 42 located below the connecting member 10 is greater, and compressive deformation of the first damping spring 41 located above the connecting member 10 is smaller. The second damping spring 42 is located between the connecting member 10 and the spring seat 11, the sleeve 3 moves downwards, and the sleeve 3 and the connecting member 10 make relative displacement together relative to the suspender 2 until the second damping spring 42 located below the connecting member 10 is compressed, and the first damping spring 41 located above the connecting member 10 is gradually compressed at the same time.

According to the vibration detection device of the washing machine, provided by the present disclosure, the top of the suspender 2 is connected with the casing of the washing machine, and the top of the sleeve 3 is connected with the outer tub of the washing machine, so that the outer tub of the washing machine is suspended in the casing. Before the washing machine begins to work, pre-weighing is carried out firstly by the vibration detection device of the washing machine, and then weighing is carried out after clothing is put into the washing machine by users. Because the inner tub of the washing machine and the outer tub of the washing machine are connected together, the outer tub exerts a force on the sleeve 3, and the sleeve 3 slides relative to the suspender 2, then, the electromagnetic coil 6 and the magnet 5 perform relative motions, thus, the magnetic flux in the electromagnetic coil 6 changes, the inductance in the electromagnetic coil 6 changes. A computer program controller is used for determining the weight of the clothing through detecting the inductance change in the electromagnetic coil 6 and determining the weight of the clothing and the water inflow through twice weighing. When water enters into the inner tub of the washing machine, as the inner tub and the outer tub are connected together, the pressure on the sleeve 3 exerted by the outer tub on increases and then the damping springs are compressed, the sleeve 3 slides along the suspender 2, then, the magnet 5 and the electromagnetic coil 6 make relative displacement, the magnetic flux of the electromagnetic coil 6 changes, and the inductance in the electromagnetic coil 6 change. The inductance in the electromagnetic coil 6 is detected through a corresponding device, thus, the weight of water inflow of the washing machine can be detected, and thus, the water inflow is controlled. When dewatering of the washing machine begins, the outer tub will generate vibration, energy of vibration is absorbed through the deformation of the damping springs to achieve vibration damping. The vibratory magnitude of the outer tub is achieved through detecting the inductance change of the electromagnetic coil 6. The control program of the computer program controller of the washing machine is used for carrying out load error correcting, and thus, the stability of dewatering operation of the washing machine is improved.

Embodiment II

The difference between this embodiment and Embodiment I is that:

The bottom end of the sleeve 3 is not provided with the bottom cover 14, the first compression spring 15 and the second compression spring 16. The magnet 5 and the suspender 2 are fixedly arranged, the electromagnetic coil 6 and the sleeve 3 are fixedly arranged. The magnetic flux in the electromagnetic coil 6 changes when the suspender 2 and the sleeve 3 axially slide relatively.

In this embodiment, the magnet 5 and the suspender 2 are fixedly arranged and the magnet 5 is located at the bottom end of the suspender 2. The electromagnetic coil 6 sleeves on the magnet 5 and is fixedly arranged on the internal wall of the sleeve 3. In other embodiments, the electromagnetic coil 6 and the suspender 2 may be fixedly arranged, and the magnet 5 and the sleeve 3 may be fixedly arranged.

Implementation schemes in the above-mentioned embodiments can be further combined or replaced, the embodiments are only used for describing preferred embodiments of the present disclosure, but not intended to limit the conception and scope of the present disclosure, and all kinds of variations and improvements on the technical scheme of the present disclosure made by those skilled in the art without departing from the design concept of the present disclosure all fall within the protection scope of the present disclosure.

The invention claimed is:

1. A vibration detection device of a washing machine, comprising a suspender, a first damping spring, a second damping spring, a sleeve, a bottom cover and an electromagnetic sensing device, wherein the electromagnetic sensing device comprises an electromagnetic coil and a magnet, an upper end of the suspender is configured to be connected with a casing of the washing machine, the bottom cover is fixed at a bottom of the sleeve, the electromagnetic coil and the magnet are arranged below a lower end of the suspender, the electromagnetic coil is sleeved on the magnet and is connected with the bottom cover, and the magnet and the electromagnetic coil are enclosed inside the sleeve by the bottom cover, a first compression spring arranged between the bottom cover and the magnet is respectively connected with the bottom cover and the magnet, and a second compression spring arranged between a bottom end of the suspender and the magnet is respectively connected with the bottom end of the suspender and the magnet;

the first damping spring and the second damping spring are arranged in the sleeve and connected in series an elastic coefficient of the first damping spring is different with an elastic coefficient of the second damping spring, the sleeve is movable in an axial direction of the suspender.

2. The vibration detection device of the washing machine according to claim 1, wherein, a lower end of the second damping spring is in contact with the lower end of the suspender, and an upper end of the first damping spring is in contact with a top of an inner side of the sleeve.

3. The vibration detection device of the washing machine according to claim 2, further comprising a connecting member, wherein the first damping spring and the second damping spring are connected through the connecting member, the connecting member is in a shape of a cylinder with an outer diameter matched with an inner diameter of the sleeve, and the connecting member is sleeved on the suspender in a slidable manner.

4. The vibration detection device of the washing machine according to claim 3, wherein the first damping spring is shorter than the second damping spring.

5. The vibration detection device of the washing machine according to claim 2, wherein the first damping spring is shorter than the second damping spring.

6. The vibration detection device of the washing machine according to claim 1, wherein a spring seat and a fixing base are further arranged at the lower end of the suspender, the spring seat and the fixing base are a shape of convex platform with a center through hole, the fixing base is sleeved on the suspender and is supported by the lower end of the suspender, and the spring seat is sleeved on the fixing base and is in contact with the lower end of the second damping spring to support the second damping spring.

7. The vibration detection device of the washing machine according to claim 6, further comprising a sliding cup, wherein the sliding cup is ring-shaped, the sliding cup is sleeved on the fixing base and is clamped by a big-diameter section of the fixing base and a big-diameter section of the spring seat, and an outside diameter of the sliding cup is matched with an inside diameter of the sleeve.

8. The vibration detection device of the washing machine according to claim 7, wherein a guiding groove in axial direction is formed in a center of the bottom cover, the electromagnetic coil is fixed on an inner wall of the guiding groove, the magnet is located inside the guiding groove, and an outer circumference of the magnet is matched with an inner circumference of the electromagnetic coil.

9. The vibration detection device of the washing machine according to claim 1, wherein the first damping spring is shorter than the second damping spring.

* * * * *